United States Patent

Kobayashi et al.

[11] Patent Number: 5,558,345
[45] Date of Patent: Sep. 24, 1996

[54] STEPPED BOOT ATTACHMENT STRUCTURE

[75] Inventors: Kinzo Kobayashi; Shinji Suzuki; Takahiro Tokunaga, all of Yamanashi-ken, Japan

[73] Assignee: Tokico, Ltd., Kanagawa-ken, Japan

[21] Appl. No.: 361,558

[22] Filed: Dec. 22, 1994

[30] Foreign Application Priority Data

Dec. 25, 1993 [JP] Japan .................................. 5-348103

[51] Int. Cl.$^6$ .................................. F16J 15/52; F16J 9/00
[52] U.S. Cl. .................................. 277/168; 277/212 FB; 188/72.4
[58] Field of Search .................... 277/9, 168, 212 FB; 188/72.4, 72.5, 370

[56] References Cited

U.S. PATENT DOCUMENTS

| | | |
|---|---|---|
| 4,199,159 | 4/1980 | Evans .................................. 277/212 FB |
| 4,809,821 | 3/1989 | Fulmer .................................. 188/72.4 |
| 5,176,390 | 1/1993 | Lallement .......................... 277/212 FB |

FOREIGN PATENT DOCUMENTS

| | | | |
|---|---|---|---|
| 2657136 | 7/1991 | France .................................. 188/72.4 |
| 1154007 | 9/1963 | Germany .......................... 277/212 FB |

Primary Examiner—Scott W. Cummings
Attorney, Agent, or Firm—Wenderoth, Lind & Ponack

[57] ABSTRACT

In a boat attachment structure, an inner circumferential groove is formed at an open end of a cylinder bore of a caliper. A deep bottom section and a shallow bottom section are provided on the bottom of the inner circumferential groove, and therefore a step is formed between them. A dust boot having of a cylindrical elastic body with a thickened engagement section on the peripheral surface is inserted in the cylinder bore, and the engagement section is fit in the inner circumferential groove. Since each of chips produced during machining of the groove is parted by the step, chips will not remain in the inner circumferential groove.

3 Claims, 4 Drawing Sheets

STEPPED BOOT ATTACHMENT STRUCTURE

BACKGROUND OF THE INVENTION

The present invention relates to a boot attachment structure which is used for sealing a clearance between a bore, such as a cylinder bore of a caliper of a disk brake, and a component which is movable and installed in the bore by a boot.

The attachment of a boot between a bore and a component which is movably housed in the bore is well known. This is conducted, in general, by forming a groove in the circumferential direction in the bore, providing a boot with a thickened engagement section in the circumferential direction, and by fitting this thickened section to the groove by utilizing elastic deformation. Since this groove is formed by a turning tool having an edge of the same width as that of the groove, chips are not easily discharged from the groove and often remain therein. Chips remaining in the groove damage the engagement section or deteriorate the sealing property.

SUMMARY OF THE INVENTION

The present invention has been made in consideration of the above point and provides a boot attachment structure which is arranged in such a way that chips do not remain in the inner circumferential groove when the inner circumferential groove of a bore is machined.

The invention provides a boot attachment structure which is arranged such that a thickened engagement section of a boot consisting of a cylindrical elastic body in which a thickened engagement section is formed in the circumferential direction on the peripheral surface is fit into a inner circumferential groove of a bore. The boot attachment structure is characterized in that a step or a shoulder of a small height is provided in the circumferential direction on the bottom of the inner circumferential groove.

In this way, chips will not remain in the inner circumferential groove at the time the inner circumferential groove is cut because the chips are parted by the step. Therefore, the engagement section can be prevented from being damaged by the chips. Moreover, if the height of the step is made 0.5 mm or less, intimate contact between the engagement section and the inner circumferential groove is especially well maintained and does not damage the sealing property.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 5:
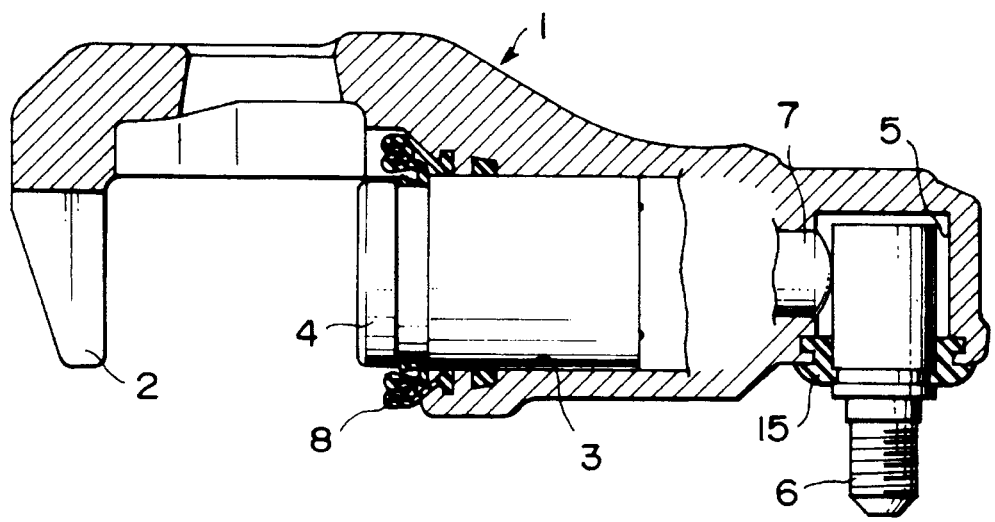
FIG. 5 is a schematic vertical section of a caliper of a hydraulic disk brake for automobiles.
Figure 6:
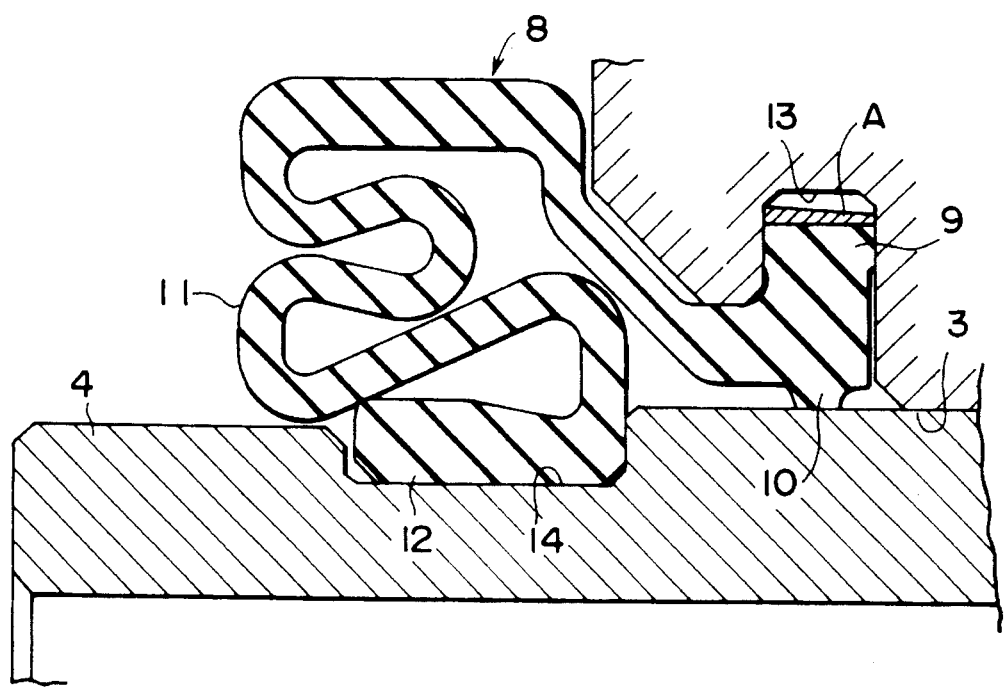
FIG. 6 is an enlarged view of essential parts of a conventional dust boot attachment structure for a cylinder bore of the caliper.
Figure 7:
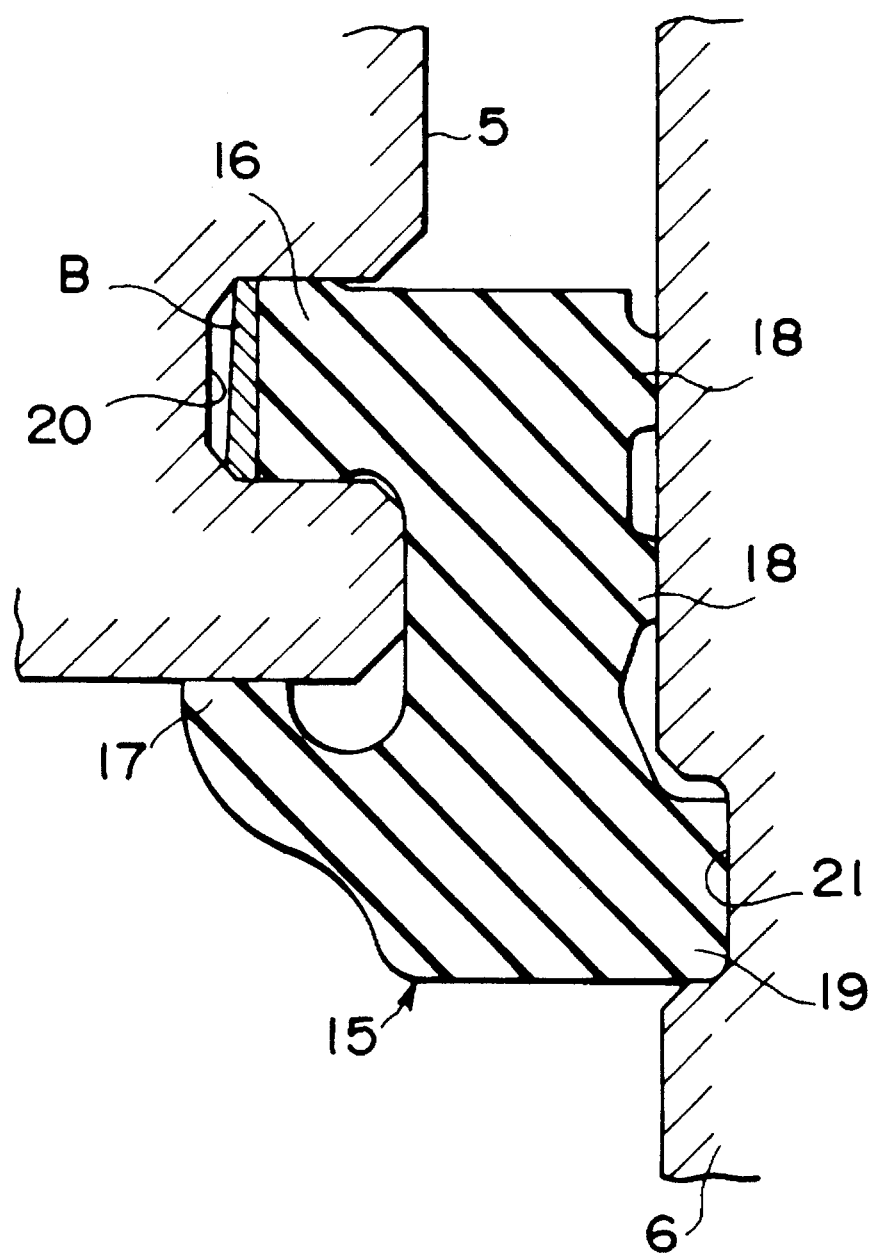
FIG. 7 is an enlarged view of essential parts of a conventional dust boot attachment structure for a cam shaft attachment hole.

A conventional boot attachment structure for a bore on which a boot is to be attached will be described with reference to FIGS. 5 through 7 by using a caliper of a hydraulic disk brake for automobiles as an example for convenience of description prior to the description of an embodiment of the present invention. FIG. 5 shows a caliper of a hydraulic disk brake schematically and, as shown in the figure, the caliper 1 is provided with a cylinder bore 3 facing a claw section 2 and a slidable piston 4 is fit in the cylinder bore 3. A braking force is generated by supplying pressurized oil into the cylinder bore 3 from a master cylinder (not shown) to move the piston 4 forward and to push pads (not shown) arranged at both sides of the disk plate (not shown) with the piston 4 and the claw section 2 against the disk plate.

Moreover, the caliper 1 is provided with a cam shaft attachment bore 5 which is connected to the cylinder bore 3. A cam shaft 6 is inserted in the cam shaft attachment bore 5 and the cam shaft is rotatably supported. A plunger 7 is provided between the cam shaft 6 and the piston 4. A parking brake lever (not shown) is connected to the cam shaft 6. The piston 4 is moved forward with the rotation of the cam shaft 6 by the parking brake lever to push the pads against the disk plate to generate a braking force.

The cylinder bore 3 is provided with a dust boot 8 at its open end to seal the clearance between the cylinder bore and the piston 4 so as to prevent the intrusion of dirt and other materials. As shown in FIG. 6, the dust boot 8 is a cylindrical sealing component consisting of an elastic body, such as rubber. A thickened engagement section 9 is formed in the circumferential direction on the outer periphery at one end. A raised sealing section 10 is formed in the circumferential direction on the internal circumferential surface. Moreover, a bellows-like expansion section 11 is formed at the other end, as shown in the figure. A flange section 12 which resides inwardly of the bellows-like expansion section 11, is formed at the distal end of the expansion section 11. On the other hand, the cylinder bore 3 (a boot-attachment bore) is provided with an inner circumferential groove 13 at the open end. Moreover, the piston 4 is provided with an outer circumferential groove 14 at the distal end. It is arranged such that the dust boot 8 is attached to the open end of the cylinder bore 3 by fitting the engagement section 9 of the dust boot 8 in the inner circumferential groove 13 of the cylinder bore 3 by elastic deformation, bringing the sealing section 10 into contact with the outer circumferential surface of the piston, and fitting the flange section 12 in the outer circumferential groove 14 of the piston 4 by elastic deformation.

In this way, the dust boot 8 is installed at the open end of the cylinder bore 3. The dust boot 8 seals the clearance between the cylinder bore and the piston 4 and prevents intrusion of dirt and other materials. The movement of the piston 4 is allowed by the expansion section 11.

The cam shaft attachment bore 5 is also provided with a dust boot 15 at its open end to seal the clearance between the cam shaft attachment bore and the cam shaft 6 so as to prevent the intrusion of dirt and other materials. As shown in FIG. 7, the dust boot 15 is a cylindrical sealing component consisting of an elastic body, such as rubber. A thickened engagement section 16 is formed in the circumferential direction on the outer periphery at one end. A peripheral flange 17 is formed in the circumferential direction at the other end. Raised sealing sections 18 are formed in the circumferential direction on the internal circumferential surface. Furthermore, an internal flange section 19 is projected in the circumferential direction the end having the peripheral flange 17. On the other hand, the cam shaft attachment bore 5, which forms the hole receiving the dust boot 15, is provided with an inner circumferential groove 20 at its open end. Moreover, the cam shaft 6 is provided with an outer circumferential groove 21. It is arranged such that the dust boot 15 is attached to the open end of a cam shaft attachment bore 5 by fitting the thickened engagement section 16 of the dust boot 15 in the inner circumferential groove 20 of the cam shaft attachment bore 5 by elastic deformation, bringing the sealing sections 18 into contact with the peripheral surface of the cam shaft 6, bringing the inner circumferential flange section 19 into contact with the outer circumferential groove 21 of the cam shaft 6 by elastic deformation, and bringing the peripheral flange 17 into contact with the end face of the cam shaft attachment bore 5.

In this way, the dust boot 15 is installed at the open end of the cam shaft attachment bore 5. The dust boot 15 seals the clearance between the cam shaft attachment bore and the cam shaft 6 to prevent the intrusion of dirt and other materials and to enable the cam shaft 6 to be rotated.

In the above conventional dust boot attachment structure, the inner circumferential groove 13 of the cylinder bore 3 is formed by cutting with a turning tool to form a groove having an edge of the same width as the inner circumferential groove 13, in general. In this conventional structure, chips often remain in the inner circumferential groove 13 because of insufficient chip discharge. As shown in FIG. 6, if a dust boot 8 is attached in a state such that a chip A remains in the inner circumferential groove 13, the thickened engagement section 9 will be damaged by chip A, deteriorating its sealing property. There is also the possibility of rust generation on the sliding surface of the piston 4 due to the entry of rain water, etc., through the damaged portion. Similarly, chips also often remain in the inner circumferential groove 20 of the cam shaft attachment bore 5 when an inner circumferential groove is cut. The thickened engagement section 16 will be damaged by a chip B remaining in the inner circumferential groove 20, as shown in FIG. 7, deteriorating its sealing property. A problem arises in that rust is generated on the cam shaft 6 due to the entry of rain water, etc., from the damaged portion.

An embodiment of the present invention will be described in detail below with reference to the drawings. A boot attachment structure according to the embodiment is different only in the shape of the inner circumferential groove of the boot attachment bore in comparison with the above conventional example. Therefore, the same numbers will be given to the same components in the above conventional example and only different portions will be described in detail.

Figure 1:
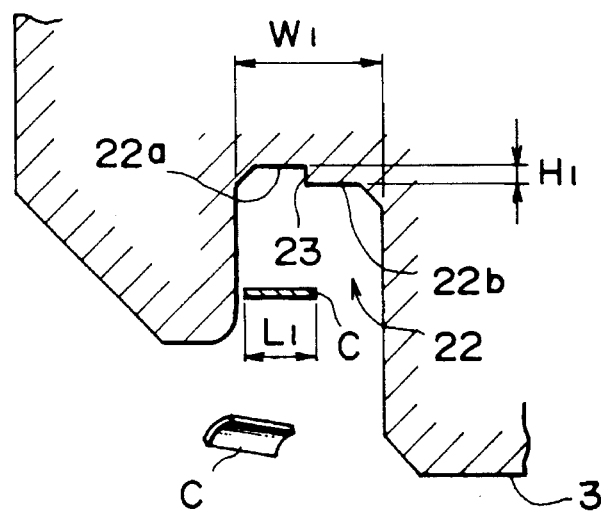
FIG. 1 is a vertical section of essential parts of a cylinder bore of a brake caliper to which a boot attachment structure of an embodiment of the present invention is applied.

The attachment structure of a dust boot 8 to a cylinder bore 3 will be described with reference to FIG. 1. As shown in FIG. 1, an inner circumferential groove 22 for fitting a thickened engagement section 9 of the dust boot 8 is formed at the open end of the cylinder bore 3 that is for receiving a slidable piston 4. The bottom of the inner circumferential groove 22 is provided with a deep bottom section 22a, which is offset toward the open end of the cylinder bore 3 and formed in the circumferential direction and a shallow bottom section 22b. A shoulder 23 is provided between the deep bottom section 22a and the shallow bottom section 22b. It is desirable that the height difference $H_1$ of the shoulder 23 difference between the deep bottom section 22a and the shallow bottom section 22b be 0.5 mm or less.

Next, the operation of the above arrangement will be described. Similarly to the conventional example shown in FIG. 6, a dust boot 8 can be installed at the open end of the cylinder bore 3 by fitting the thickened engagement section of the dust boot 8 in the inner circumferential groove 22.

Since the shoulder 23 is formed in the bottom of the inner circumferential groove 22, a chip C generated when an inner circumferential groove 22 is cut is parted by the step formed by the shoulder 23. Dimension $L_1$ is made sufficiently small compared to width $W_1$ of the inner circumferential groove 22. Therefore, the chip C is easily discharged from the inner circumferential groove 22 and will not remain in the groove. Chips remaining in the inner circumferential groove 22 thus do not damage the dust boot 8, preventing the sealing property from being lowered due to damage of the dust boot 8. If the height $H_1$ of the shoulder 23 is made 0.5 mm or less, intimate fitting between the thickened engagement section of the dust boot 8 and the inner circumferential groove 22 is maintained, also not damaging the sealing property. Moreover, a cut will not be generated in the thickened engagement section 9 by contact with the shoulder 23.

Figure 2:
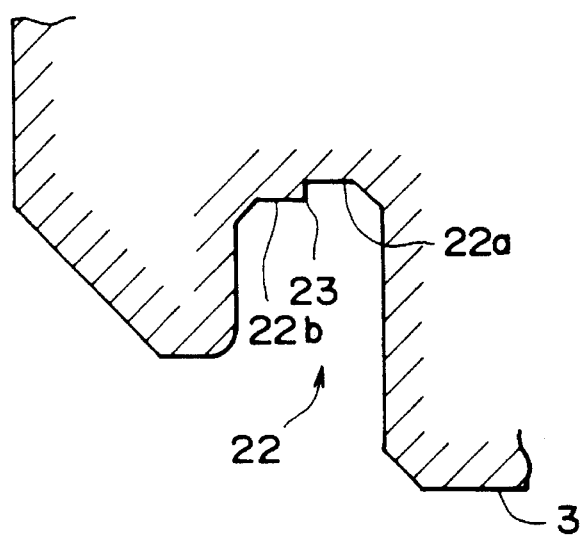
FIG. 2 is a vertical section of essential parts of a cylinder bore of a brake caliper showing another embodiment in which the shape of an inner circumferential groove at a bottom section is different from FIG. 1.

In the above embodiment, the deep bottom section 22a is formed offset toward the open end of a cylinder bore 3 and the shallow bottom section 22b is formed at the bottom section. However, a similar operation can be obtained by forming the shallow bottom section 22b toward the open end of the cylinder bore as in FIG. 2 and thus form an arrangement inverted from that shown in FIG. 1.

Figure 3:
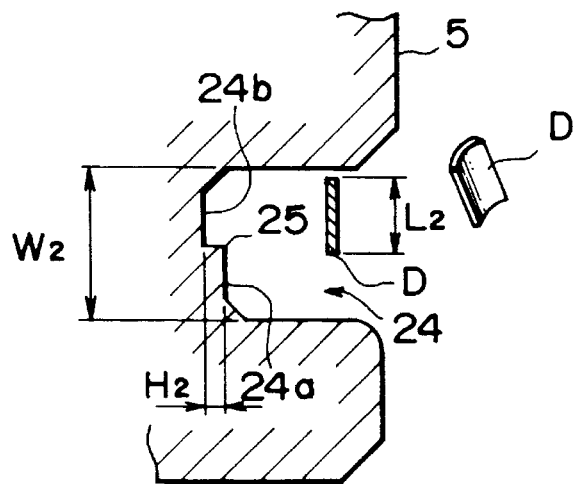
FIG. 3 is a vertical section of essential parts of a cam shaft attachment bore of a brake caliper to which a boot attachment structure of an embodiment according to the present invention is applied.

Next, an attachment structure to the cam shaft attachment bore 5 of the dust boot 15 will be described with reference to FIG. 3. As shown in FIG. 3, an inner circumferential groove 24, which receives a thickened engagement section 16 of the dust boot 15, is formed at the open end of the cam shaft attachment bore 5 in which a cam shaft 6 is inserted and rotatably supported. The inner circumferential groove 24 is provided with a shallow bottom section 24a, which is formed in the circumferential direction on the open end side of the cam shaft attachment bore 5, and a deep bottom section 24b which is formed in the circumferential direction on the inner side of the cam shaft attachment bore 5. A shoulder 25 is formed between the shallow bottom section 24a and the deep bottom section 24b. It is desirable that the height $H_2$ of the shoulder 25 between the shallow bottom section 24a and the deep bottom section 24b be 0.5 mm or less.

The operation of the above arrangement will be described below. The thickened engagement section 16 of the dust boot 15 is fit in the inner circumferential groove 24. The dust boot 15 can be installed at the open end of the cam shaft attachment bore 5 similarly to the conventional example shown in FIG. 7.

Since the shoulder 25 is formed in the bottom of the inner circumferential groove 24, a chip D generated when the inner circumferential groove 24 is cut is parted by the shoulder 25. Dimension $L_2$ is made sufficiently small compared to width $W_2$ of the inner circumferential groove 24. Therefore, the chip D is easily discharged from the inner circumferential groove 24 and will not remain in the inner circumferential groove 24. Since the dust boot 15 is not damaged by chips remaining in the inner circumferential groove 24, the lowering of the sealing performance due to damage to the dust boot 15 can be prevented. If the height $H_2$ of the shoulder 25 is made 0.5 mm or less, intimate contact between the thickened engagement section of the dust boot 15 and the inner circumferential groove 24 can be maintained, thus not damaging the sealing property. Moreover, a cut will not be generated in the thickened engagement section 16 by contact with the shoulder 25.

Figure 4:
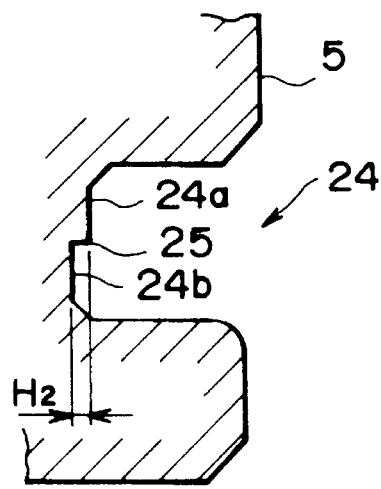
FIG. 4 is a vertical section of the essential parts of a cam shaft attachment bore of a brake caliper showing another embodiment in which the shape of an inner circumferential groove at a bottom section is different from FIG. 3.

The shallow bottom section 24a is formed on the open-end side of the cam shaft attachment bore 5 and the deep bottom section 24b is formed on the inner side in the embodiment shown in FIG. 3. However, even if the deep bottom section 24b is formed on the open-end side of the cam shaft attachment bore 5 and the shallow bottom section 24a is formed on the inner side, as shown in FIG. 4, a similar operation can be obtained.

The inner circumferential grooves 22 and 24 in the above embodiments can be cut by an integral shaped turning tool having a step in the edge or by a combination of two turning tools arranged to have a step at the distal ends.

Although the attachment structure of a dust boot to the cam shaft attachment bore and the cylinder bore of the brake caliper are described as an example in the above embodiment, the present invention is not limited to this application, but may be applied to any arrangements in which a boot having a thickened engagement section on the peripheral surface in the circumferential direction is fit in the inner circumferential groove of the attachment bore.

As stated above in detail, chips will not remain in the inner circumferential groove in a boot attachment structure according to the present invention because chips are parted by a shoulder provided in the bottom of the inner circumferential groove in the attachment bore. As a result, there is the advantage that boot damage by chips remaining in the inner circumferential groove is eliminated, and lowering of the sealing performance can be prevented. Moreover, if the height of the shoulder is made 0.5 mm or less, good contact between the thickened engagement section and the inner circumferential groove is maintained and the sealing property becomes highly reliable.

What is claimed is:

1. A boot attachment structure in which a boot has a cylindrical elastic body that has an outer surface and a circumferential engagement portion on the outer surface, a bore has an inner circumferential groove formed therein, the inner circumferential groove has a bottom, the bottom has a step formed therein in the circumferential direction, the step has a height of 0.5 mm or less, and the engagement portion is fitted into the inner circumferential groove.

2. The boot attachment structure of claim 1, wherein the bore is a cylinder bore formed in a caliper of a disk brake.

3. The boot attachment structure of claim 1, wherein the bore is a cam shaft attachment hole of a parking brake.

* * * * *